United States Patent [19]

Ostoja-Starzewski et al.

[11] Patent Number: 4,893,911

[45] Date of Patent: Jan. 16, 1990

[54] POLARIZERS BASED ON POLYACETYLENE, AND THE PRODUCTION THEREOF

[75] Inventors: Karl-Heinz Ostoja-Starzewski, Bad Vilbel; Josef Witte, Colonge; Uwe Claussen, Leverkusen, all of Fed. Rep. of Germany

[73] Assignee: Bayer Aktiengesellschaft, Leverkusen, Fed. Rep. of Germany

[21] Appl. No.: 44,330

[22] Filed: Apr. 30, 1987

[30] Foreign Application Priority Data

May 10, 1986 [DE] Fed. Rep. of Germany ....... 3615765

[51] Int. Cl.$^4$ .......................... G02B 5/30; B29D 11/00
[52] U.S. Cl. ..................................... 350/398; 252/585; 264/1.3
[58] Field of Search ................ 350/370, 398; 252/585; 264/1.3

[56] References Cited

U.S. PATENT DOCUMENTS

| | | | |
|---|---|---|---|
| 2,255,940 | 9/1941 | Rogers | 350/398 X |
| 2,572,315 | 10/1951 | Campbell | 350/398 |
| 3,254,562 | 6/1966 | Blout et al. | 350/398 |
| 4,229,498 | 10/1980 | Suzuki et al. | 350/398 X |

*Primary Examiner*—Rodney B. Bovernick
*Assistant Examiner*—David J. Edmondson
*Attorney, Agent, or Firm*—Connolly and Hutz

[57] ABSTRACT

New light-polarizing articles (preferably in film form) are based on a polymer matrix which polarizers based on a polymer matrix which is constructed from polar or nonpolar monomer units or mixtures thereof, characterized in that polyacetylene is included as light-polarizing substance, said polyacetylene being obtained by polymerizing acetylene in solutions of said polymer matrix and thereafter processing the resultant polyacetylene/polymer solutions into polarizers.

20 Claims, No Drawings

POLARIZERS BASED ON POLYACETYLENE, AND THE PRODUCTION THEREOF

The invention relates to polarizers based on a polymer matrix and polyacetylene, and the production thereof by polymerization of acetylene in solutions of the polymer matrix and processing of the resultant polyacetylene/polymer solutions into polarizers, particularly into polarizer films.

The production of polarizer films based on polyvinyl alcohol and iodine is known, for example, from DD 210,342 and the further literature cited therein. Here, a polyvinyl alcohol film is later coloured. Complicated production and aftertreatment processes are required in order to obtain passably satisfactory results. However, only part of the film is generally usable. Finally, the production of polarizer films is in practice limited to a few active substances, which limits its applicability.

Polarizers based n a polymer matrix have now been found which are characterized in that polyacetylene is included as the light-polarizing substance.

The invention furthermore relates to a process for the production of polarizers based on a polymer matrix in which polyacetylene is included as light-polarizing substance, characterized in that acetylene is polymerized in a solution of the matrix polymer, preferably with the aid of a suitable catalyst, the polymer solution containing polyacetylene is processed into moulded articles, and the polarizer is produced by generation of a privileged direction.

The privileged direction can be generated by stretching or drawing the moulded article, preferably after production of the moulded article.

The invention furthermore relates to the use of such moulded articles for generating polarized light, it being possible, for example, for the film to be covered, if appropriate, with further films or with glass layers, depending on the field of application.

The polarizers have a high optical quality and transparency.

The polymer matrix can be constructed from polar or nonpolar monomer units, if appropriate mixtures thereof.

The polyacetylene is preferably distributed homogeneously in the matrix.

In a preferred embodiment, less than 50 per cent by weight, relative to the polarizer, of polyacetylene is included.

Polymers which are suitable for the polymer matrix are, for example, polyvinyl alcohol, polyacrylonitrile and polyvinyl chloride, and also copolymers which contain such monomer units, such as, for example, partly saponified polyvinyl acetates or selectively hydrogenated butadiene-acrylonitrile copolymers.

As catalysts, all catalysts for the preparation of polyacetylene are suitable as long as they are not deactivated by the polymer solution, particularly nickel compounds, preferably those which can be prepared by reaction of a nickel-(0) compound, or a compound which can be converted into a nickel-(0) compound in situ, with compounds of the formulae (I) and, if appropriate, (II)

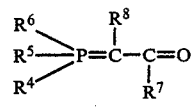

(I)

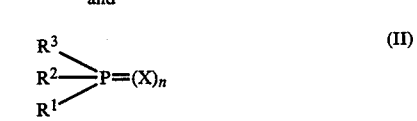

(II)

in which

R$^1$, R$^2$ and R$^3$, independently of one another, denote optionally halogen-, hydroxyl-, C$_1$-C$_{20}$alkoxy-, C$_6$-C$_{12}$-aryloxy- or nitro-substituted C$_1$-C$_{20}$-alkyl, C$_6$-C$_{12}$-aryl or C$_3$-C$_8$-cyclo-alkyl, furthermore C$_6$-C$_{12}$-aryl-C$_1$-C$_{20}$-alkyl, C$_1$-C$_{20}$-alkyl, -C$_6$-C$_{12}$-aryl, C$_1$-C$_{20}$-alkyl- C$_3$-C$_8$-cycloalkyl, C$_6$-C$_{12}$-aryl-C$_3$-C$_8$-cycloalkyl, C$_2$-C$_6$-alkenyl, C$_6$-C$_{12}$-aryl-C$_2$-C$_6$-alkenyl, di-C$_1$-C$_4$-alkylamino and optionally substituted phenoxy or alkoxy, X denotes O, NR$^9$ or

n denotes zero or one, R$^4$, R$^5$, R$^6$, R$^7$ and R$^8$, independently of one another, denote optionally halogen-, hydroxyl-, C$_1$-C$_{20}$-alkoxy- or C$_6$-C$_{12}$-aryloxy-substituted C$_1$-C$_{20}$-alkyl, C$_6$-C$_{12}$-aryl, C$_2$-C$_3$O-alkenyl - or C$_3$-C$_8$-cycloalkyl, furthermore C$_6$-C$_{12}$-aryl, halogen, hydroxyl, C$_1$-C$_{20}$-alkoxy or C$_6$-C$_{12}$-aryloxy, in addition R$^7$ denotes hydrogen, R$^8$ denotes hydrogen or sulphonate, acyl and R$^9$, R$^{10}$ and R$^{11}$, independently of one another, denote hydrogen, acyl, silyl, nitrophenyl, halogen, cyano or R$^1$, or by reaction of nickel compounds which can be prepared by reaction of a nickel-(0) compound, or a compound which can be converted into a nickel-(0) compound in situ, with an adduct or a mixture of maleic anhydride, a compound of the formula II where n=0 and a compound of the formula II where n=0 or 1, in which R$^1$, R$^2$ and R$^3$ have the abovementioned meaning, or nickel compounds which can be prepared by reaction of a nickel-(0) compound, or a compound which can be converted into a nickel-(0) compound in situ, with an adduct or a mixture of a quinoid compound and a compound of the formula II where n=0 and a compound of the formula II where n=0 or 1, in which R$^1$, R$^2$ and R$^3$ have the abovementioned meaning.

Suitable quinoid compounds are o- or p-quinoid compounds of the benzene and naphthalene series, and also anthraquinones which may be further substituted.

Examples which may be mentioned are p-benzoquinone, chloranil, 1,4-naphthoquinone and 9,10-anthraquinone.

Preferred radicals R$^1$, R$^2$ and R$^3$ are C$_1$-C$_6$-alkyl, cyclohexyl, phenyl, tolyl, benzyl, di-C$_1$-C$_4$-alkylamino, phenoxy and C$_1$-C$_4$-alkoxy.

R$^4$ is preferably C$_6$-C$_{12}$-aryl.

R$^5$, R$^6$, R$^7$ and R$^8$ are preferably cyclohexyl, phenyl, tolyl, benzyl, vinyl and C$_1$-C$_4$-alkyl.

$R^7$ is, in addition, preferably hydrogen or $C_1-C_4$alkoxy, and $R^8$ is, in addition, preferably hydrogen acetyl, benzoyl, or sulphonate.

$R^9$, $R^{10}$ and $R^{11}$ are preferably hydrogen, $C_1-C_6$-alkyl, phenyl, chlorophenyl, nitrophenyl, $C_1-C_6$-alkenyl and phenyl-$C_2-C_6$-alkenyl.

1-4 moles of the compound of the formula (I) and 0-4 moles of the compound of the formula (II) are preferably employed per mole of nickel-(0) compound, particularly preferably 1 mole of the compound of the formula (I) and 1 mole of the compound of the formula (II) per mole of the nickel-(0) compound.

The reaction temperature is 0°-100° C., particularly 20°-70° C.

The reaction is carried out with exclusion of oxygen, preferably in a solvent, which must be inert towards the reactants, such as benzene, toluene, cyclohexane and n-hexane.

After completion of the reaction, the catalyst is isolated as a solid, usually by filtration, the solution previously being concentrated and/or cooled if required.

The catalyst may also be employed directly for the polymerization of acetylene without isolation.

Examples which may be mentioned as nickel-(0) compound are Ni(cyclooctadiene)$_2$ and Ni(allyl)$_2$.

Examples which may be stated as nickel compounds which can be converted into nickel-(0) compounds in situ are: Ni acetylacetonate, Ni octanoate and Ni stearate, which may be reduced with the aid of conventional reducing agents, such as boranate, alanate, alkylaluminium compounds or organolithium compounds.

The amount of nickel compound used is not critical. Typical catalyst concentrations are between 10 and $10^{-6}$, preferably between $10^{-2}$ and $10^{-4}$ moles per liter. The amount of catalyst, relative to acetylene, is in the range from 0.1 to 10 per cent by weight, preferably 0.5 to 5 per cent by weight.

Polymerization may be carried out continuously and batchwise.

The polymerization temperature is preferably 0° to +140° C., particularly 60° to 100° C., activation of the catalyst by organoaluminium compounds, for example by alkoxyaluminiumdialkyl or trialkylaluminium, is to be recommended at low temperatures.

The polymerization may be carried out at atmospheric pressure, but the polymerization is also possible under pressure. The acetylene may be taken from the cylinder and used without further purification. In the case of acetone-sensitive catalysts, it is recommended that any acetone contained in the acetylene be previously frozen out in a cold trap.

On a macroscopic scale, the polyacetylene-containing polymer products according to the invention exhibit either a heterogeneous or a homogeneous polyacetylene distribution in the polymer matrix. The heterogeneous distribution manifests itself by discrete black particles of polyacetylene in the polymer matrix, although in highly-disperse distribution. The preferred homogeneous distribution manifests itself by a continuous yellowbrown, reddish, violet to black-blue colouration of the clear polymer product.

Particularly preferred polarizers are films, but they may also exist in the form of plates or fibres, for example.

The polymer solutions with polyacetylene may be processed into films using methods which are conventional per se. Reference is made, for example, to Ullmanns Enzyklopädie der techn. Chemie [Ullmann's Encyclopaedia of Industrial Chemistry], 4th edition, Verlag Chemie, Weinheim/Bergstrasse.

The resultant films are stretched in a fashion which is known per se in order to obtain the desired polarizing properties. The degree of drawing depends on the desired properties; in a preferred embodiment, the films are stretched in a ratio from 1:1.5 to 1:15.

The thickness of the resultant films depends on the proposed use. In general, the thickness of the films is 1 to 100 $\mu$m.

CATALYST PREPARATION 5 mmol of nickel(0) bis-cyclooctadiene in 100 ml of dry nitrogen-saturated toluene are mixed under nitrogen with 5 mmol of benzoyl-methylene-triphenylphosphorane and 5 mmol of methylene-trimethylphosphorane. The mixture is warmed for 1 hour at 40 to 60° C. with vigorous stirring. The dark yellow/brown solution is filtered and evaporated to dryness in vacuo. The yellow catalyst is dissolved in 25 ml of dry nitrogen-saturated dimethylformamide. This solution, or a part thereof, is employed in the following acetylene polymerization.

EXAMPLE 10 g of polyvinyl alcohol were dissolved under inert gas in 90 g of dry DMF (degassed, N$_2$-saturated) at 100° C. to 120° C. in a 250 ml reaction flask (gas inlet, dropping funnel without pressure equalization with N$_2$-supply, stirrer, internal thermometer, reflux condenser with bubble counter) and the temperature was then kept at 80° C. 0.5 mmol of the catalyst described above were then stirred into 2.5 ml of DMF under N$_2$, and an even stream of acetylene gas (dry ice/acetone) was passed in for 10 minutes. The reaction solution was heated briefly to 100° C. and subsequently filtered through a polyamide cloth of pore width 200 $\mu$m.

The clear red-brown PVA-PAC solution was applied hot, in a coating of 400 $\mu$m, to a PET film using a coating knife. After evaporation of the solvent, a clear, red-brown, transparent film was obtained which was stripped off from the substrate and stretched at about 90° C. in the ratio 1:4.

The stretched film exhibited a good light-polarizing action of greater than 90 %.

We claim:

1. Polarizers based on a polymer matrix which is constructed from polar or nonpolar monomer units or mixtures thereof, characterized in that polyacetylene is included as light-polarizing substance, said polyacetylene being obtained by polymerizing acetylene in solutions of said polymer matrix and thereafter processing the resultant polyacetylene/polymer solutions into polarizers.

2. Polarizers according to claim 1, characterized in that the polymer matrix is constructed from polar monomer units.

3. Polarizers according to claim 1, characterized in that the polymer matrix is constructed from a mixture of polar and nonpolar units.

4. Polarizers according to claim 1, characterized in that polyacetylene is distributed homogeneously in the matrix.

5. Polarizers according to claim 1, characterized in that less than 50% by weight of polyacetylene is included.

6. Polarizers according to claim 1, characterized in that processing results in moulded articles of films wherein further a privileged direction is generated.

7. Polarizers according to claim 6, characterized in that processing results in films.

8. Polarizers according to claim 6, characterized in that the privileged direction is generated by stretching or drawing.

9. Polarizers according to claim 1, characterized in that acetylene polymerization is carried out in the presence of acetylene polymerization catalysts which are not deactivated by the matrix polymer solution.

10. Polarizers according to claim 9, characterized in that the acetylene polymerization is carried out in the presence of nickel compounds as catalysts.

11. Polarizers according to claim 10, characterized in that the acetylene polymerization is carried out in the presence of nickel compounds which can be prepared by reaction of nickel-(0) compound, or a compound which can be converted into a nickel-(0) compound in situ, with compounds of the formula (I) or of the formula (I) and (II)

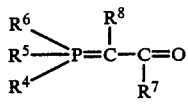

and

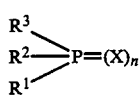

in which
R$^1$, R$^2$ and R$^3$, independently of one another, denote C$_1$-C$_{20}$-alkyl, C$_6$-C$_{12}$-aryl, or C$_3$-C$_8$-cycloalkyl unsubstituted or substituted by halogen, hydroxyl, C$_1$-C$_{20}$-alkoxy, C$_6$C$_{12}$-aryloxy or nitro, or R$^1$, R$^2$ and R$^3$ are C$_6$-C$_{12}$-aryl- C$_1$-C$_{20}$-alkyl, C$_1$-C$_{20}$-alkyl-C$_6$-C$_{12}$-aryl, C$_1$-C$_{20}$-alkyl-C$_3$-C$_8$-cycloalkyl, C$_6$-C$_{12}$-aryl-C$_3$-C$_8$-cyclo-alkyl, C$_2$-C$_6$-alkenyl, C$_6$-C$_{12}$-aryl-C$_2$-C$_6$-alkenyl, di-C$_1$-C$_4$-alkylamino, phenoxy, substituted phenoxy or alkoxy, X denotes O, NR$^9$ or

n denotes zero or one,
R$^4$, R$^5$, R$^6$, R$^7$ and R$^8$, independently of one another, denote C$_1$-C$_{20}$-alkyl, C$_6$-C$_{12}$-aryl, C$_2$-C$_{30}$-alkenyl or C$_3$-C$_8$-cycloalkyl unsubstituted or substituted by halogen, hydroxyl, C$_1$-C$_{20}$-alkoxy or C$_6$-C$_{12}$-aryloxy, C$_6$-C$_{12}$-aryl, or R$^4$, R$^5$, R$^6$, R$^7$ and R$^8$ are halogen, hydroxyl, C$_1$-C$_{20}$-alkoxy or C$_6$-C$_{12}$-aryloxy, R$^7$ denotes hydrogen R$^8$ denotes hydrogen or sulphonate, acyl, and R$^9$, R$^{10}$ and R$^{11}$, independently of one another, denote hydrogen, acyl, silyl, nitrophenyl, halogen, cyano or R$^1$, or by reaction of nickel compounds which can be prepared by reaction of a nickel-(0) compound, or a compound which can be converted into a nickel-(0) compound in situ, with an adduct or a mixture of maleic anhydride, a compound of the formula II where n=0 and a compound of the formula II where n=0 or 1, in which R$^1$, R$^2$ and R$^3$ have the above-mentioned meaning, or nickel compounds which can be prepared by reaction of a nickel-(0) compound, or a compound which can be converted into a nickel-(0) compound in situ, with an adduct or a mixture of a quinoid compound and a compound of the formula II where n=0 and a compound of the formula II where n=0 or 1, in which R$^1$, R$^2$ and R$^3$ have the above-mentioned meaning.

12. Polarizers according to claim 10, characterized in that the acetylene polymerization is carried out at a temperature of 60°–100° C.

13. Polarizers according to claim 12, characterized in that the nickel compound is present in a concentration of 10$^{-2}$–10$^{-4}$ mole per liter.

14. Polarizers according to claim 10, characterized in that the nickel compound is present in an amount of 0.1–10% be weight, relative to the amount of acetylene.

15. Polarizers according to claim 14, characterized in that the nickel compound is present in an amount of 0.5–5% be weight, relative to the amount of acetylene.

16. Polarizers according to claim 1, characterized in that the acetylene polymerization is carried out at a temperature of 0°–140° C.

17. Polarizers according to claim 16, characterized in that the acetylene polymerization is carried out at a temperature of 60°–100° C.

18. Polarizers which comprise a polymer matrix with polyacetylene homogeneously distributed therein as a light-polarizing substance.

19. Polarizers according to claim 18, characterized in that the matrix contains less than 50% by weight of polyacetylene.

20. Polarizers according to claim 18 wherein the polymer matrix comprises copolymerized polar monomers and non-polar monomers.

* * * * *

UNITED STATES PATENT AND TRADEMARK OFFICE
CERTIFICATE OF CORRECTION

PATENT NO. : 4,893,911

DATED : January 16, 1990

INVENTOR(S) : Karl-Heinz Ostoja-Starzewski; Josef Witte; Uwe Claussen

It is certified that error appears in the above-identified patent and that said Letters Patent is hereby corrected as shown below:

Column 1, line 21, "Polarizers based n" should correctly read --Polarizers based on--;

Column 2, line 34, "$C_2$-$C_3$0-alkenyl" should correctly read --$C_2$-$C_{30}$-alkenyl--;

Column 5, line 39, "$C_6C_{12}$- aryloxy" should correctly read --$C_6$-$C_{12}$- aryloxy--;

Column 6, line 3, "$C6$-$C_{12}$-aryl" should correctly read --$C_6$-$C_{12}$-aryl--;

Column 6, line 31, "$10^{-2-10-4}$ mole" should correctly read --$10^{-2}$-$10^{-4}$ mole--.

Signed and Sealed this

Thirty-first Day of December, 1991

Attest:

HARRY F. MANBECK, JR.

*Attesting Officer*   *Commissioner of Patents and Trademarks*